United States Patent [19]

Inoue et al.

[11] Patent Number: 5,388,679
[45] Date of Patent: Feb. 14, 1995

[54] TORQUE TRANSMISSION DEVICE OF A FOUR-WHEEL DRIVE VEHICLE

[75] Inventors: Masahiro Inoue, Yamatokohriyama; Shuzo Hirakushi, Uda, both of Japan

[73] Assignee: Koyo Seiko Co., Ltd., Osaka, Japan

[21] Appl. No.: 50,966

[22] Filed: Apr. 22, 1993

Related U.S. Application Data

[62] Division of Ser. No. 858,369, Mar. 24, 1992.

[30] Foreign Application Priority Data

Mar. 25, 1991 [JP] Japan .................... 3-60496

[51] Int. Cl.$^6$ ............... B60K 17/35; F16D 25/02
[52] U.S. Cl. .................... 192/35; 192/48.3; 192/57; 192/85 AA; 192/103 F; 74/650; 180/249
[58] Field of Search .......... 192/35, 48.3, 54, 57, 192/58 R, 60, 85 AA, 103 F; 180/249; 74/650

[56] References Cited

U.S. PATENT DOCUMENTS

| | | |
|---|---|---|
| 2,986,024 | 5/1961 | Power . |
| 3,133,617 | 5/1964 | Hartmann . |
| 4,266,445 | 5/1981 | Goscenski, Jr. . |
| 4,569,250 | 2/1986 | Nellums . |
| 4,645,049 | 2/1987 | Matsuda et al. . |
| 4,683,998 | 8/1987 | Cigdem et al. . |
| 4,719,998 | 1/1988 | Hiramatsu et al. . |
| 4,727,966 | 3/1988 | Hiramatsu et al. . |
| 4,821,604 | 4/1989 | Asano . |
| 4,848,506 | 7/1989 | Shimada et al. . |
| 4,905,808 | 3/1990 | Tomita et al. . |
| 4,909,371 | 3/1990 | Okamoto et al. ........... 192/103 F |
| 4,919,248 | 4/1990 | Hiramatsu et al. . |
| 4,940,125 | 7/1990 | Sato et al. ................. 192/85 AA |
| 4,995,491 | 2/1991 | Hiramatsu et al. . |
| 5,036,963 | 8/1991 | Murata . |
| 5,046,595 | 9/1991 | Sumiyoshi et al. ........ 192/85 AA |
| 5,070,975 | 10/1991 | Tanaka et al. . |

FOREIGN PATENT DOCUMENTS

| | | |
|---|---|---|
| 59-170534 | 2/1985 | Japan . |
| 63-2727 | 1/1988 | Japan ................... 180/249 |
| 3-262730 | 11/1991 | Japan . |
| 2189861 | 11/1987 | United Kingdom . |

*Primary Examiner*—Richard M. Lorence
*Attorney, Agent, or Firm*—Popham, Haik, Schnobrich & Kaufman, Ltd.

[57] ABSTRACT

A torque transmission device of a four-wheel drive vehicle having a pair of drive shafts includes a hydraulic pump for transmitting torque to both drive shafts through a variable oil pressure generated therein according to the difference in rotational speed between both drive shafts, and a multiple disc clutch for transmitting torque to both drive shafts by a frictional coupling power. The hydraulic pump has a casing and a rotor housed therein. The casing is rotated by one of the drive shafts. The rotor is rotated by the other drive shaft through a transmitting member, a hydraulic piston mechanism and a rotary sleeve. The transmitting member has a clutch operating portion for operating the clutch. When the transmitted torque exceeds a predetermined level, the hydraulic piston mechanism is adapted to move the transmitting member to operate the multiple disc clutch with no intermediary of the casing.

5 Claims, 18 Drawing Sheets

TORQUE TRANSMISSION DEVICE OF A FOUR-WHEEL DRIVE VEHICLE

CROSS-REFERENCE TO RELATED APPLICATION

This application is a divisional application of Ser. No. 07/858,369, filed Mar. 24, 1992.

BACKGROUND OF THE INVENTION

1. Field of the Invention

The present invention relates to a torque transmission device of a four-wheel drive vehicle for transmitting torque, as interposed between a pair of drive shafts of the four-wheel drive vehicle.

2. Description of the Prior Art

A four-wheel drive vehicle is not only excellent in running properties on rough roads, but also excellent in accelerating properties and running stability on general roads. Accordingly, such a four-wheel drive vehicle is now rapidly widespread among the general public.

There is known a four-wheel drive vehicle in which the front-wheel drive shaft is rigidly connected to the rear-wheel drive shaft. In this arrangement, however, the propeller shafts are twisted if there is a difference in the number of rotations between the front wheels and the rear wheels due to the difference in turning radius between the front wheels and the rear wheels at the time when the vehicle travels at a corner. Further, the arrangement above-mentioned presents the problem of a so-called tight corner braking phenomenon that the rear wheels presenting a smaller turning radius are dragged as slipping, causing the vehicle to become shaky. To prevent the problems above-mentioned such as the tight corner braking phenomenon and the like, a conventional four-wheel drive vehicle is provided between the drive shafts with a torque transmission device which can transmit torque to both drive shafts while allowing the difference in rotational speed between both drive shafts.

As the torque transmission device above-mentioned, there are proposed a so-called viscous coupling, a device of the hydraulic pump type using a vane pump, and the like.

Disposed in the viscous coupling are a plurality of first clutch discs rotatable together with one of the drive shafts and a plurality of second clutch discs rotatable together with the other drive shaft, first and second clutch discs being alternately disposed as coming in close contact with each other. Both first and second clutch discs are hermetically sealed with highly viscous oil interposed therebetween. In a normal state, both first and second discs are coupled to each other by a fluid frictional power of the discs with the oil and a shear force inside of the oil, so that torque is transmitted. When the difference in rotational speed between both first and second discs becomes great, the oil is stirred and thermally expanded. This causes both first and second discs to be pressingly contacted with each other, so that both drive shafts are securely coupled to each other to suddenly increase the torque (a so-called hump phenomenon occurs).

As the hydraulic pump device above-mentioned, there is known a device using a vane pump formed such that a rotor having vanes rotatable together with one of the drive shafts is coaxially disposed in a cam ring of a casing rotatable together with the other drive shaft. In the vane pump, the rotor and the cam ring are coupled to each other through pressurized oil interposed therebetween, so that torque is transmitted to both drive shafts. Theoretically, the torque thus transmitted is greater as the pressure generated by the vane pump is higher; that is, the difference in rotational speed between the both drive shafts is greater.

In a viscous coupling, the hump phenomenon above-mentioned enables both drive shafts to be securely coupled to each other. Accordingly, the viscous coupling is advantageous in that it can be incorporated in a differential gear for example and used as a limited slipped differential gear for directly coupling the right- and left-wheels to each other as necessary. However, such a viscous coupling presents the problem of durability that, by an explosive increase in inner pressure at the time when the hump phenomenon takes place, the seals are broken and the oil among the plates is deteriorated by shear.

In a device of the hydraulic pump type, the torque is transmitted by an inner pressure force of the oil, and not by its shear force. Accordingly, such a device is advantageous in view of durability because the oil is hardly deteriorated. However, when the pressure generated becomes high, the side plates which are disposed at both end surfaces of the cam ring and which form a pressure chamber of the vane pump, are deformed to cause the gap between the rotor and the side plates to become great. This restrains the generated pressure from being increased, so that the transmitted torque cannot be sufficiently increased for the increase in difference in rotational speed between both drive shafts. To overcome the problem above-mentioned, it may be proposed to thicken the side plates to increase the rigidity thereof. However, an available space is often limited to make it difficult to make such provision.

To overcome all the problems of the both systems above-mentioned, there is proposed a torque transmission device in which a multiple disc clutch is axially incorporated in the device of the hydraulic pump type above-mentioned with a plurality of plates of the clutch being adjacent to one another, and in which the multiple disc clutch is adapted to be operated through a clutch operating member by a cam mechanism so that the both drive shafts are securely coupled to each other, when the difference in rotational speed between both drive shafts is increased (that is, when the torque transmitted by a hydraulic pump is increased) (Publication for Japanese Patent Unexamined Application 262730/1991).

In this torque transmission device, the cam mechanism is disposed between the housing of the torque transmission device and the casing of the hydraulic pump. The entire hydraulic pump is axially moved by the cam mechanism, and the multiple disc clutch operating member is pushed through the hydraulic pump. Accordingly, a great load is applied to the casing of the hydraulic pump. It is therefore necessary to provide the casing with sufficient strength. This disadvantageously advantageously increases the production cost and the sizes of the hydraulic pump. This subsequently causes the torque transmission device to become large-sized.

SUMMARY OF THE INVENTION

It is an object of the present invention to provide a small-size economical torque transmission device of a four-wheel drive vehicle excellent in durability which can be suddenly increased in torque transmitted as necessary.

To achieve the object above-mentioned, the present invention provides, as a phase thereof, a torque transmission device of a four-wheel drive vehicle interposed between a pair of drive shafts, which comprises:

- a hydraulic pump having a cylindrical casing rotatable interlockingly with one of said pair of drive shafts and a cylindrical rotor coaxially housed in said cylindrical casing and rotatable interlockingly with the other drive shaft, said hydraulic pump being adapted to transmit torque between said pair of drive shafts through a variable oil pressure generated in said hydraulic pump according to the difference in rotational speed between said pair of drive shafts;
- a rotary sleeve coaxially integrally rotatably connected to the inner peripheral portion of said rotor;
- a transmitting member disposed between said other drive shaft and said rotary sleeve for transmitting the rotation of said other drive shaft to said rotor through said rotary sleeve, said transmitting member being axially movable with respect to said casing;
- a multiple disc clutch having a plurality of annular first clutch discs integrally rotatably connected to said casing, and a plurality of annular second clutch discs integrally rotatably connected to said transmitting member, said first and second clutch discs being alternately disposed, said multiple disc clutch being adapted to transmit torque between said drive shafts through a frictional coupling power of said first and second discs with said casing and said rotor restrained from being relatively rotated by said frictional coupling power;
- a clutch operating portion disposed at said transmitting member for pushing said first and second discs to cause the same to be frictionally coupled to each other; and
- a cam mechanism disposed between the end surface of said casing and said transmitting member for transmitting torque to said transmitting member and said rotary sleeve, said cam mechanism being adapted to axially move said transmitting member having said clutch operating portion with respect to the end surface of said casing thereby to operate said multiple disc clutch, only when said torque exceeds a predetermined level.

In the torque transmission device of a four-wheel drive vehicle having the arrangement above-mentioned, the casing is rotated interlockingly with one drive shaft, and the rotor is rotated through the transmitting member rotatable interlockingly with the other drive shaft, the cam mechanism and the rotary sleeve. When the difference in rotational speed between the rotor and the casing, i.e., between both drive shafts, is small, torque is transmitted between both drive shafts by only the hydraulic pump through the rotary sleeve, the cam mechanism and the transmitting member. When the difference in rotational speed becomes great and the torque transmitted by the hydraulic pump exceeds a predetermined level, i.e., when the torque transmitted by the cam mechanism exceeds a predetermined level, the cam mechanism moves the transmitting member having the clutch operating portion with respect to the casing of the hydraulic pump, so that the first and second clutch discs of the multiple disc clutch are pressingly contacted with each other. This causes the drive shafts to be securely coupled to each other through the casing, the multiple disc clutch and the transmitting member. This enables to suddenly increase the torque transmitted to both drive shafts. It is noted that such increase in torque is not achieved by an explosive increase in inner pressure as done in a viscous coupling.

In a conventional torque transmission device, the cam mechanism moves the clutch operating portion through the casing of the hydraulic pump, so that the first and second discs are pushed by the clutch operating portion. Accordingly, the casing receives a great force. It is therefore required to thicken the casing, causing the hydraulic pump to be large-sized and weighty. In the torque transmission device according to a phase of the present invention, the cam mechanism is adapted to directly move the transmitting member having the clutch operating portion with no intermediary of the casing of the hydraulic pump. This reduces the load applied to the casing of the hydraulic pump, enabling the casing to be made thin. Subsequently, the hydraulic pump can be made in a compact and lightweight design, enabling the torque transmission device to be made in a compact and lightweight design.

DETAILED DESCRIPTION OF THE PREFERRED EMBODIMENTS

Figure 1:
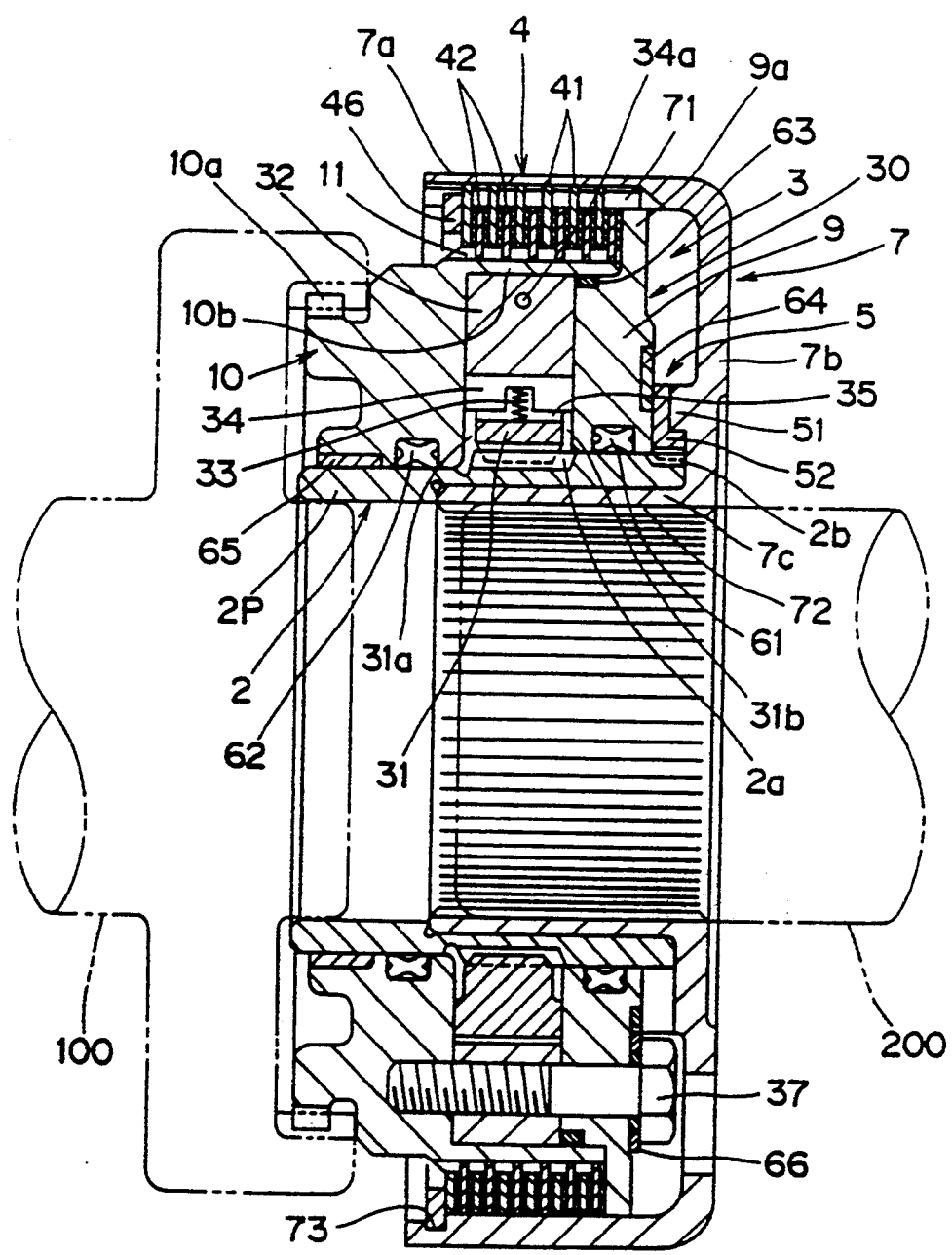
FIG. 1 is a section view of a torque transmission device of a four-wheel drive vehicle according to an embodiment of the present invention.

The following description will discuss in detail the present invention with reference to the attached drawings illustrating embodiments thereof. In the following description, the terms of "left side (hand)" and "right side (hand)" respectively refer to the left side (hand) and the right side (hand) in the drawings.

Referring to FIGS. 1 to 13, the following description will discuss the torque transmission device of a four-wheel drive vehicle according to an embodiment of the present invention.

Figure 2:
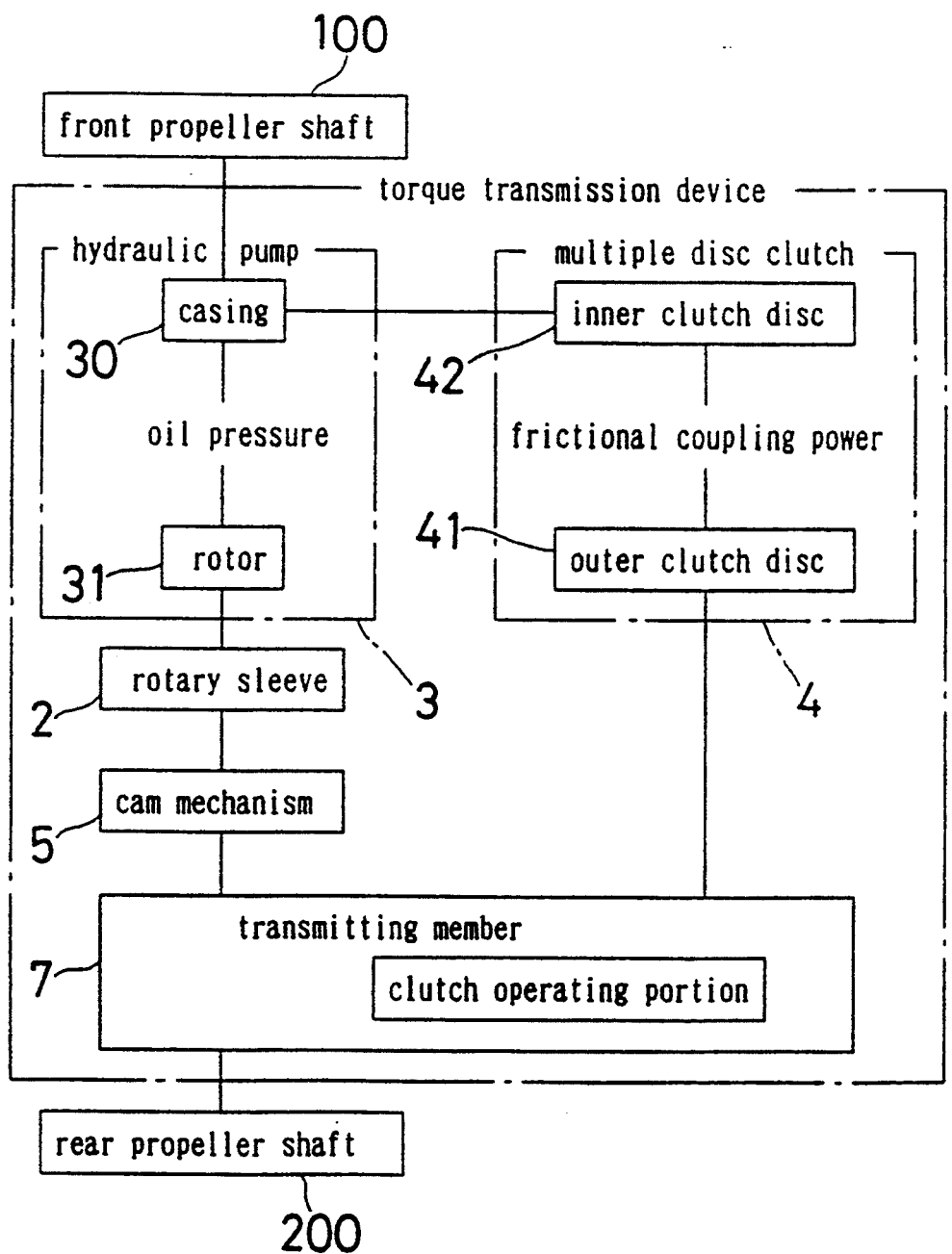
FIG. 2 is a block diagram of torque transmission passages in the device shown in FIG. 1.

As shown in FIGS. 1 and 2, the torque transmission device is disposed between a front propeller shaft 100 connected to a front-wheel differential gear, and a rear propeller shaft 200 connected to a rear-wheel differential gear. The torque transmission device has a first torque transmission passage (at the left side in FIG. 2) passing through a vane pump 3 serving as a hydraulic pump, and a second torque transmission passage (at the right side in FIG. 2) which is formed in parallel with the first torque transmission passage and which passes through a multiple disc clutch 4.

The vane pump 3 has a casing 30 rotatable interlockingly with the front propeller shaft 100, and a cylindrical rotor 31 which is coaxially housed in the casing 30 and which is rotatable interlockingly with the rear propeller shaft 200. The vane pump 3 is adapted to transmit torque to the front and rear propeller shafts 100, 200 through a variable oil pressure generated therein according to the difference in rotational speed between the propeller shafts 100, 200.

The multiple disc clutch 4 includes pairs of clutch discs 41, 42 frictionally coupled to each other, and is adapted to transmit torque between the propeller shafts 100, 200 through the frictional coupling power of the discs 41, 42.

Through the first torque transmission passage, torque is transmitted from the front propeller shaft 100 to the rear propeller shaft 200 after successively passing through the casing 30, the rotor 31, a rotary sleeve 2, a cam mechanism 5 and a transmitting member 7 in this order, or torque is transmitted from the rear propeller shaft 200 to the front propeller shaft 100 after successively passing through the members above-mentioned in the reverse order.

Through the second torque transmission passage, torque is transmitted from the front propeller shaft 100 to the rear propeller shaft 200 after passing through the casing 30, the pairs of clutch discs 41, 42 and the transmitting member 7 in this order, or torque is transmitted from the rear propeller shaft 200 to the front propeller shaft 100 after successively passing through the members above-mentioned in the reverse order.

The cam mechanism 5 is adapted to transmit torque between the transmitting member 7 and the rotary sleeve 2. Only when the torque exceeds a predetermined level, the cam mechanism 5 is adapted to move the transmitting member 7 so that a clutch operating portion 46 disposed at the transmitting member 7 operates the multiple disc clutch 4.

With reference to FIG. 1, the casing 30 includes a cylindrical cam ring 32 and a pair of annular side plates 9, 10 coaxial therewith. The cam ring 32 and the side plates 9, 10 are integrally rotatably connected to one another with a bolt 37. An annular seal plate 66 is secured to the end surface of the side plate 9 by the head portion of the bolt 37. This seal plate 66 prevents the oil from leaking out from the inside of the vane pump 3 along the shank of the bolt 37.

The side plate 10 is provided on the left-end outer peripheral portion thereof with a serrated portion 10a, through which the casing 30 of the vane pump 3 is rotated interlockingly with the front propeller shaft 100. While covering the outer peripheral portion of the cam ring 32, the side plate 10 extends to the outer peripheral portion of the other side plate 9, thereby to form a casing portion 10b fitted to the outer peripheral portion of the side plate 9 and the cam ring 32. The gap between the inner peripheral surface of the casing portion 10b and the outer peripheral portion of the side plate 9 is hermetically sealed by an O-ring 63.

In FIG. 1, the side plate 9 is provided at the right-end of the outer periphery thereof with a radially outwardly extending flange portion 9a. The clutch discs 41, 42 are held by and between the flange portion 9a and the clutch operating portion 46, and pushed by the flange portion 9a in cooperation with a snap ring serving as the clutch operating portion 46.

The rotary sleeve 2 has (i) a casing portion 2p inserted as extending over the inner peripheral portions of the side plate 9, the rotor 31 and the side plate 10 and (ii) a flange-like cam member 52 which is disposed at the end of the casing portion 2p and which has cam surfaces 52a to be discussed later. The casing portion 2p is provided at the intermediate portion of the outer periphery thereof with an outer peripheral spline 2a splined to the rotor 31 of the vane pump 3. The casing portion 2p is provided at the right-end of the outer periphery thereof with an outer peripheral spline 2b by which the cam member 52 is integrally rotatably and axially movably held. A plain bearing 65 is disposed between the side plate 10 and the left-end of the outer periphery of the rotary sleeve 2, and comprises a metallic casing member for smoothly relatively rotating the side plate 10 and the rotary sleeve 2.

The transmitting member 7 has an annular lateral wall portion 7b parallel with the side plate 9, an inner cylindrical portion 7c integrally formed on the inner periphery of the lateral wall portion 7b and an outer cylindrical portion 7a integrally formed on the outer periphery of the lateral wall portion 7b. The inner cylindrical portion 7c is provided on the inner peripheral surface thereof with an inner peripheral spline 72 splined to the rear propeller shaft 200. The outer peripheral surface of the inner cylindrical portion 7c is relatively rotatably and axially movably fitted to the inner peripheral surface of the rotary sleeve 2. Thus, the inner cylindrical portion 7c relatively rotatably supports the rotary sleeve 2. The outer cylindrical portion 7a extends axially around the outer periphery of the casing 30 of the hydraulic pump 3. The outer cylindrical portion 7a is provided in the inner peripheral surface thereof with grooves 71 for integrally rotatably holding the outer clutch discs 41.

Figure 3:
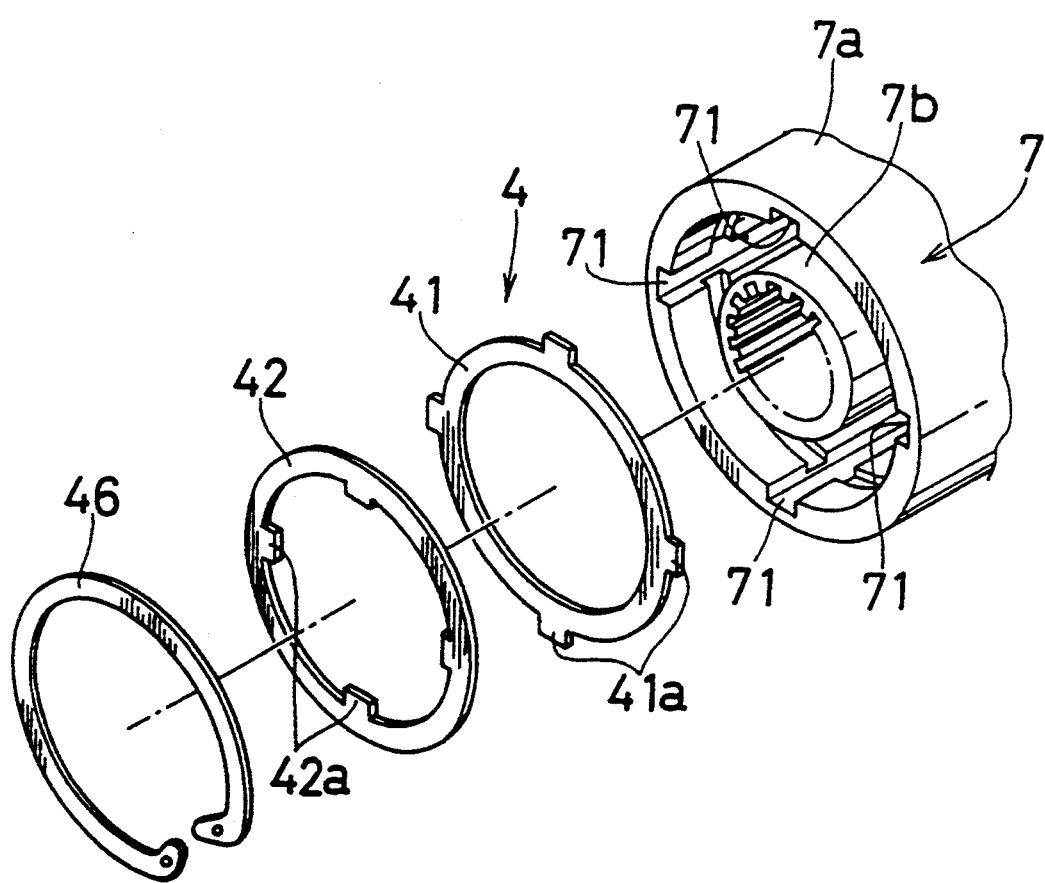
FIG. 3 is an exploded perspective view of a multiple disc clutch and a transmitting member used in the device shown in FIG. 1.
Figure 4:
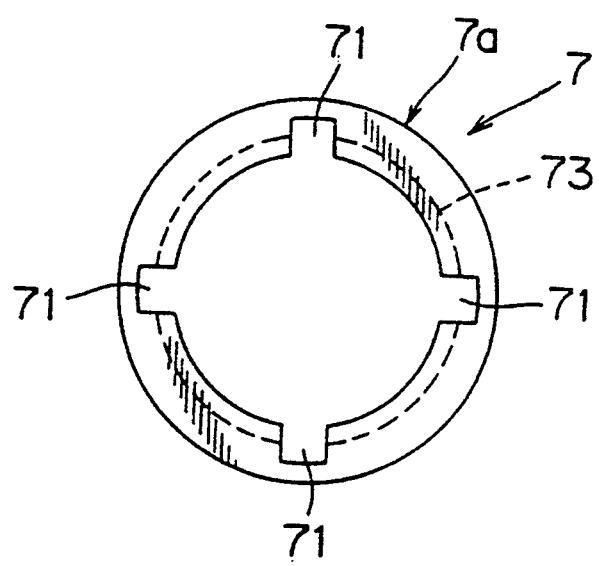
FIG. 4 is a front view of the end surface of an outer cylindrical portion of the transmitting member.
Figure 5:
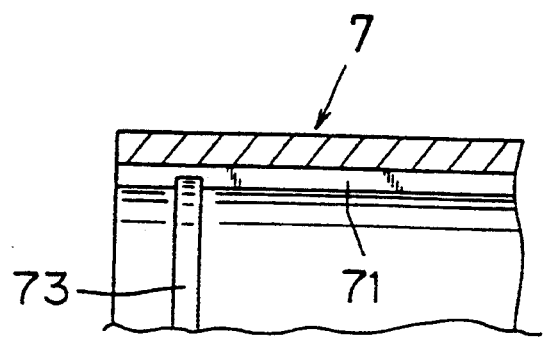
FIG. 5 is a section view of the outer cylindrical portion of the transmitting member.

As shown in FIG. 3, each of the outer clutch discs 41 is provided at the outer periphery thereof with a plurality of toothed portions 41a at regular spatial intervals in the circumferential direction. With reference to FIGS. 3 to 5, the toothed portions 41a are respectively fitted into the axially extending grooves 71 formed in the inner peripheral surface of the outer cylindrical portion 7a of the transmitting member 7. Accordingly, the outer clutch discs 41 are rotatable, in an axially movable manner, integrally with the transmitting member 7.

Figure 6:
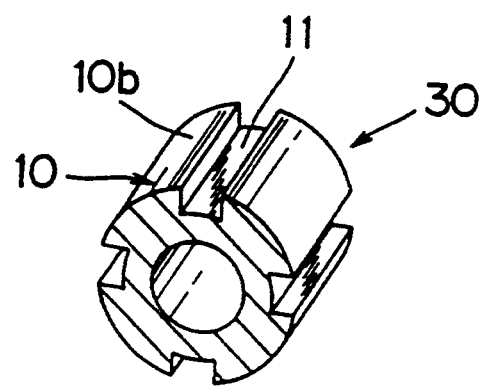
FIG. 6 is a perspective view, with portions broken away, of one of side plates.

The inner clutch discs 42 and the outer clutch discs 41 are alternately disposed in a relatively rotatable manner. Each of the inner clutch discs 42 is provided in the inner periphery thereof with a plurality of toothed portions 42a at regular spatial intervals in the circumferential direction. With reference to FIG. 6, the toothed portions 42a are fitted into axially extending grooves 11 formed in the outer peripheral surface of the casing portion 10b of the side plate 10. The inner clutch discs 42 are rotatable, in an axially movable manner, integrally with the casing 30.

The snap ring 46 is inserted in a peripheral groove 73 formed in the inner periphery of the outer cylindrical portion 7a of the transmitting member 7 and prevents the outer clutch discs 41 and the inner clutch discs 42 from coming off from the outer cylindrical portion 7a. The snap ring 46 as held in the peripheral groove 73 in the outer cylindrical portion 7a of the transmitting member 7, is axially movable integrally with the transmitting member 7. When the transmitting member 7 is moved rightward in FIG. 1, the snap ring 46 together with the flange portion 9a pushes the discs 41, 42 such that the discs 41, 42 are pressingly contacted with each other.

In FIG. 1, the gap between the inner peripheral portion of the side plate 9 and the outer peripheral portion of the rotary sleeve 2 is hermetically sealed by a seal 61. The gap between the inner peripheral portion of the side plate 10 and the outer peripheral portion of the rotary sleeve 2 is hermetically sealed by a seal 62.

In FIG. 1, the cam mechanism 5 includes cam surfaces 51a, to be discussed later, of the cam portion 51 formed integrally with the lateral wall portion 7b of the transmitting member 7, and cam surfaces 52a, to be discussed later, of the cam member 52. A plain bearing 64 made of an annular metal plate comes in contact with the left end surface oh the cam member 52 as secured to an annular concave formed in the right end surface of the side plate 9. This plain bearing 64 is adapted to smoothly rotate the cam member 52 with respect to the side plate 9.

Figure 7:
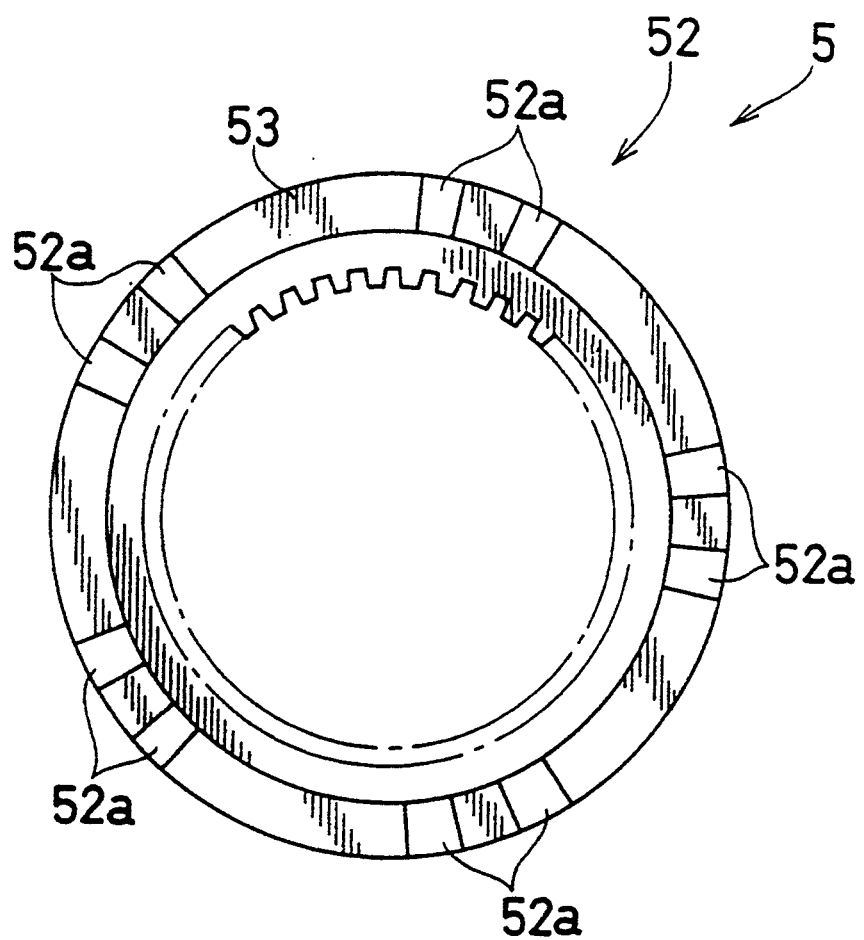
FIG. 7 is a front view of one of cam portions.
Figure 8:
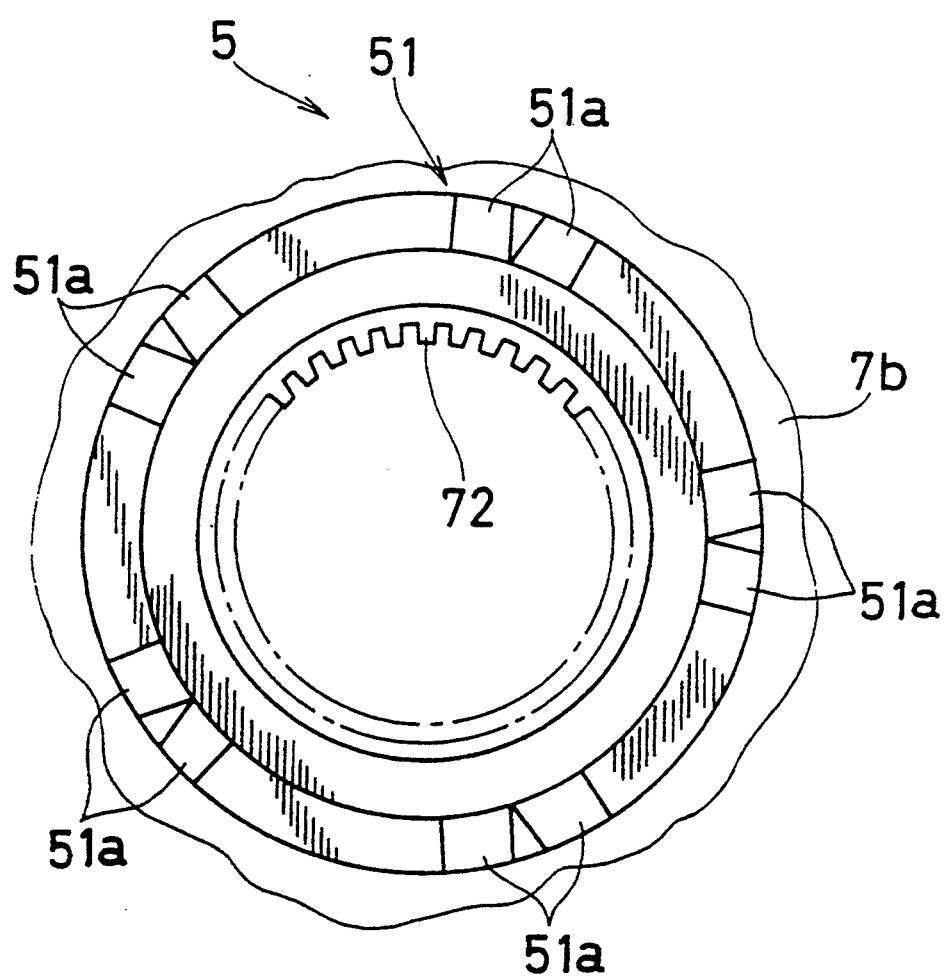
FIG. 8 is a front view of the other cam portion.
Figure 9:
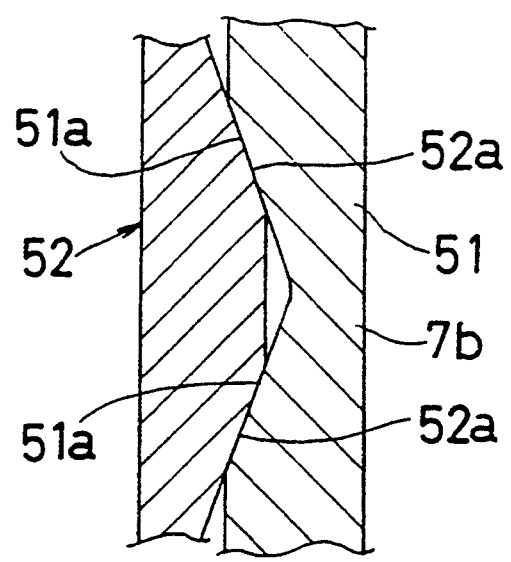
FIG. 9 is a schematic section view of a cam mechanism without the multiple disc clutch operated.
Figure 10:
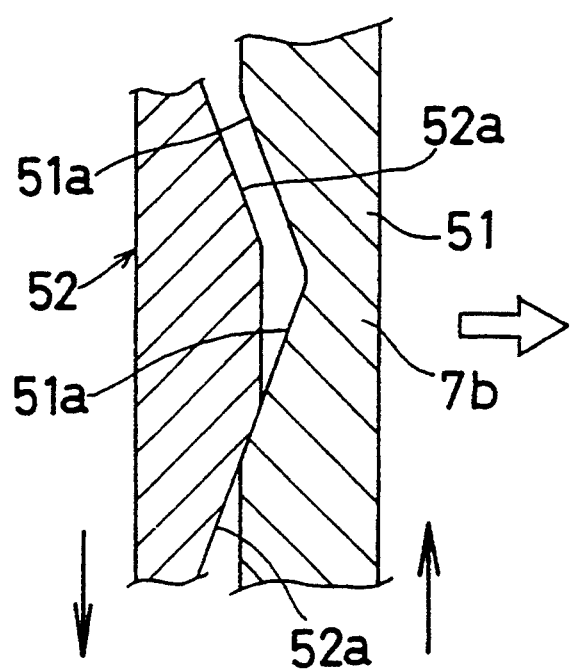
FIG. 10 is a schematic section view of the cam mechanism with the multiple disc clutch operated.

Referring to FIGS. 8 and 9, the cam portion 51 is provided on the surface of an annular projecting step portion 53 formed on the lateral wall portion 7b with a plurality of pairs of the cam surfaces 51a having flat concave surfaces, the pairs of the cam surfaces 51a being formed at regular spatial intervals in the circumferential direction. The cam surfaces 51a of each pair are respectively inclined in opposite directions along the circumference of the cam portion 51. Referring to FIGS. 7 and 10, the cam member 52 has a plurality of pairs of the cam surfaces 52a having convex surfaces which are respectively engaged with the plurality of pairs of the cam surfaces 51a. In a state where torque transmitted between the cam portion 51 and the cam member 52 is small, the cam surfaces 51a of a pair come in close contact with the cam surfaces 52a of the corresponding pair, and the distance between the cam portion 51 and the cam member 52 is very short as shown in FIG. 9. When the transmitted torque is increased and the cam portion 51 and the cam member 52 are twisted in relative rotation directions to cause the cam portion 51 and the cam portion 51 to be shifted in phase, the cam member 52 is moved rightward such that the distance between the cam member 52 and the cam portion 51 is increased, as shown in FIG. 10. Thus, a force in a rotation direction is converted into a force in an axial direction, which is then transmitted through the transmitting member 7 to the snap ring 46 serving as the clutch operating portion. The clutch discs 41, 42 are pushed to each other between the snap ring 46 and the flange 9a, causing the multiple disc clutch 4 to be engaged.

Figure 11:
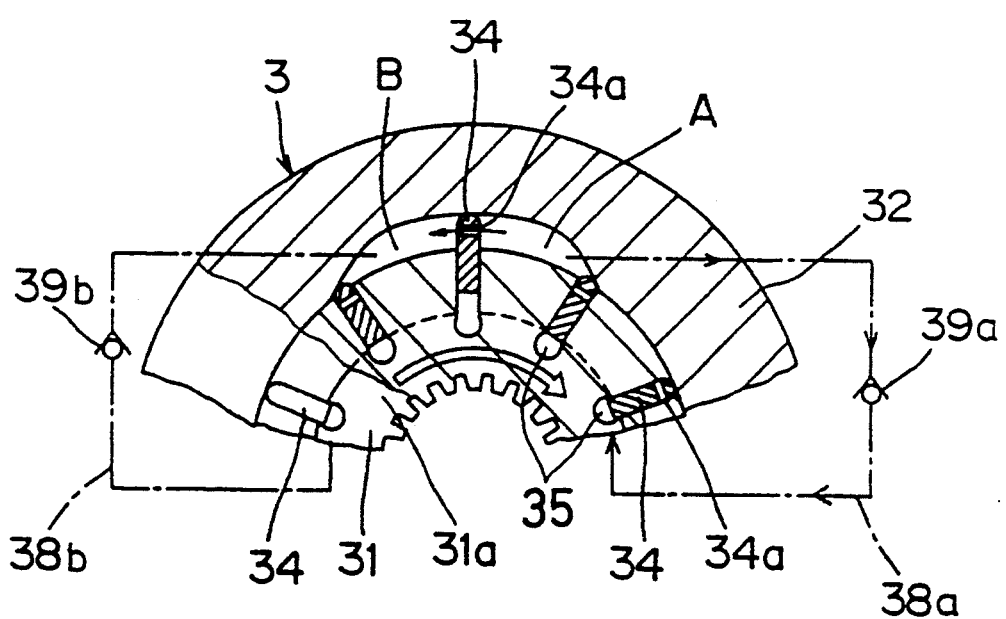
FIG. 11 is a schematic section view of a vane pump.
Figure 12:
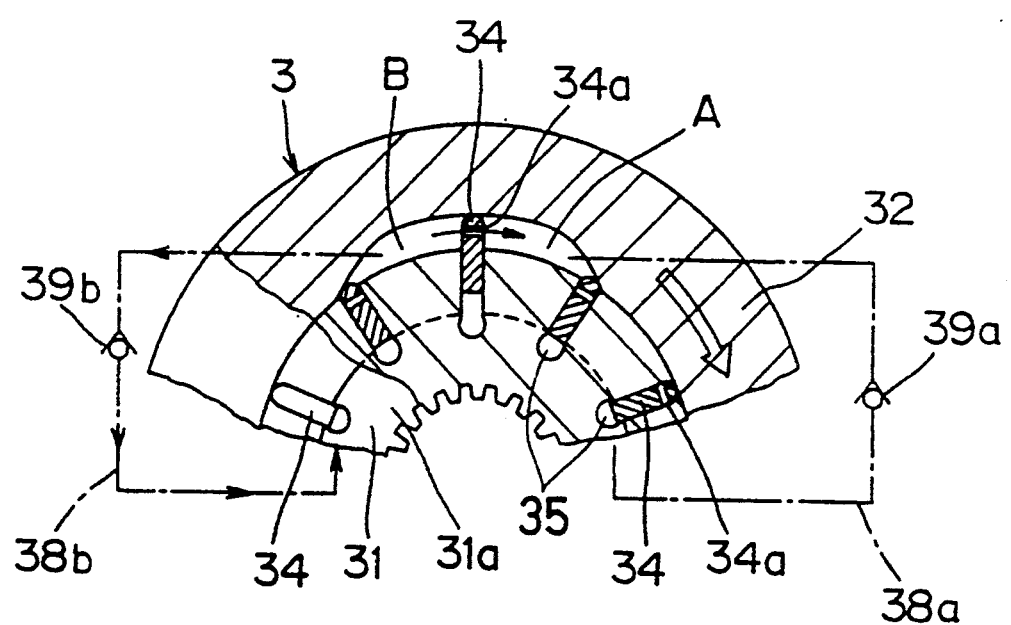
FIG. 12 is also a schematic section view of the vane pump.
Figure 13:
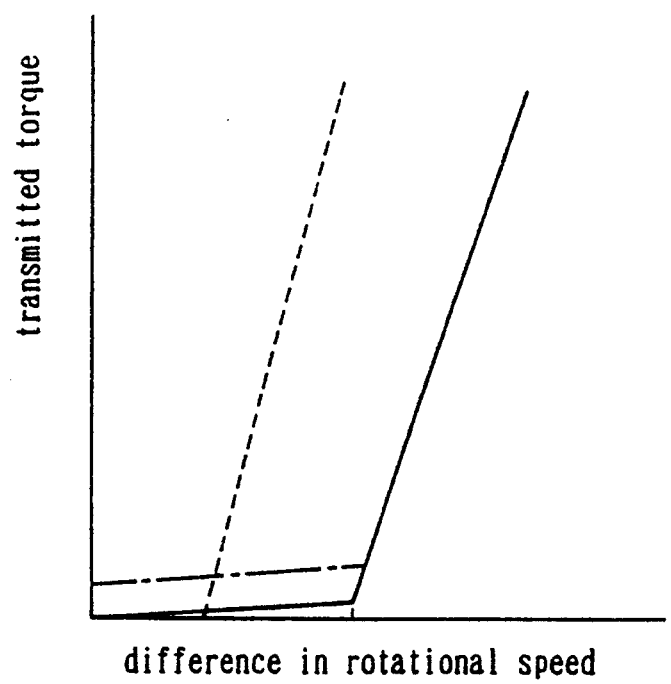
FIG. 13 is a graph illustrating the relationship between difference in rotational speed and transmitted torque.

Referring to FIGS. 1, 11 and 12, the cam ring 32 is provided in a portion of the inner peripheral surface thereof with a concave such that a space is formed between the outer peripheral surface of the rotor 31 and the inner peripheral surface of the cam ring 32. Between the concave formed in the inner peripheral surface of the cam ring 32 and the outer peripheral surface of the rotor 31, there are formed a plurality of pump chambers as held by and between a pair of side plates 9, 10. The pump chambers are divided into working chambers A, B by vanes 34 disposed on the outer peripheral portion of the rotor 31 at regular spatial intervals in the circumferential direction. The vanes 34 are radially movably housed in vane housing grooves 35 each of which has a predetermined depth in a radial direction and which is formed in the outer periphery of the rotor 31. The vanes 34 are pushed toward the inner surface of the cam ring 32 by compression coil springs 33 disposed at the bottoms of the vane housing grooves 35 (the compression coil springs 33 are shown only in FIG. 1, and not shown in FIGS. 11 and 12). The vane housing grooves 35 are opened to the both end surfaces of the rotor 31.

As shown in FIGS. 1 and 11, the vanes 34 have orifices 34a which permit the passage of oil between the working chambers A and B divided by the vanes 34. In order that the bottoms of the vane housing grooves 35 communicate with one another, the rotor 31 is provided in both end surfaces thereof with annular grooves 31a, 31b. The annular grooves 31a, 31b communicate with the working chambers A, B through oil passages 38a, 38b (not shown in FIG. 1) incorporated in the side plate 10. The pressurized oil from the working chamber A or B presenting a higher pressure so works as to push the vanes 34 toward the inner peripheral wall of the cam ring 32 through one of the oil passages 38a, 38b, thus increasing the adhesion of the vanes 34 to the inner peripheral wall of the cam ring 32. Respectively disposed in the oil passages 38a, 38b are check valves 39a, 39b which allow only the passage of oil from the pump chambers to the bottoms of the vane housing grooves 35 and which prevent the oil passage in the reverse direction. Accordingly, the check valve disposed in the oil passage connecting the annular grooves 31a, 31b to the working chamber A or B presenting a lower pressure, is closed to prevent the pressure in the working chamber presenting the lower pressure from being increased.

The following description will discuss the operation of the vane pump 3. The casing 30 is rotated interlockingly with the front propeller shaft 100, while the rotor 31 is rotated through the transmitting member 7 rotated interlockingly with the rear propeller shaft 200, the cam mechanism 5 and the rotary sleeve 2. For example, when the rear propeller shaft 200 is rotated faster than the front propeller shaft 100 with the front wheels being about to be locked at the time of application of the brakes, the rotor 31 is rotated faster than the casing 30. More specifically, the rotor 31 is rotated clockwise with respect to the casing 30 as shown by a white arrow in FIG. 11, and the vanes 34 advance toward the working chamber A. At this time, since the orifices 34a formed in the vanes 34 are small in diameter, the oil moves, with outflow resistance, from the working chamber A to the working chamber B. Subsequently, a high pressure is generated in the working chamber A and acts as a piston pressure on the working chamber A surrounded by the vanes 34 and the casing 30. With the piston pressure serving as a torque transmitting medium, torque is transmitted from the rotor 31 to the casing 30. Accordingly, braking torque from the rear wheels which are not being locked, is also transmitted to the front wheels which are about to be locked, thus assuring a braking force with respect to the road surface.

The pressure above-mentioned is greater as the difference in rotational speed between the rotor 31 and the casing 30. Accordingly, torque according to the difference in rotational speed between the front and rear propeller shafts 100, 200 is transmitted thereto.

FIG. 12 shows the state where the casing 30 is rotated clockwise with respect to the rotor 31 when the front wheels slip so that the front propeller shaft 100 is rotated faster than the rear propeller shaft 200. In this state, since the vanes 34 moves toward the working chamber B, a high pressure is generated in the working chamber B. Through the high pressure thus generated, torque is transmitted from the front propeller shaft 100 to the rear propeller shaft 200. More specifically, torque is transmitted from the front wheels at the slipping side to the rear wheels at the non-slipping side. Thus, the torque is automatically distributed to assure a grip force with respect to the road surface.

According to this embodiment, when the difference in rotational speed between the rotor 31 and the casing 30, i.e., between the propeller shafts 100, 200 is small, the vane pump 3 mainly transmits torque to the propeller shafts 100, 200 through the rotary sleeve 2, the cam mechanism 5 and the transmitting member 7. When the difference in rotational speed between the propeller shafts 100, 200 becomes great and the transmitted torque exceeds a predetermined level, the cam mechanism 5 axially moves the transmitting member 7 with respect to the vane pump 3. The snap ring 46 disposed at the transmitting member 7 and serving as the clutch operating portion, causes the outer clutch discs 41 and inner clutch discs 42 of the multiple disc clutch 4 to be pressingly contacted and frictionally engaged with each other. This causes the propeller shafts 100, 200 to be securely coupled to each other (in a so-called lock-up state) through the casing 30, the multiple disc clutch 4 and the transmitting member 7, i.e., through the second torque transmission passage. Accordingly, the torque transmitted to the propeller shafts 100, 200 can be suddenly increased as shown by a solid line in FIG. 13, thus obtaining such torque transmission characteristics that cannot be obtained with only a device of the hydraulic pump type. Accordingly, the torque transmission device can be used also as a limited slipped differential gear.

The sudden increase in torque above-mentioned is achieved by the frictional coupling power of the multiple disc clutch 4 with no intermediary of the oil pressure coupling power of the vane pump 3. Accordingly, an explosive increase in inner pressure is not accompanied as done in a viscous coupling. Thus, the torque transmission device of the present invention can overcome the problem of deterioration in durability resulting from the excessive increase in inner pressure which is inherent in the viscous coupling. Thus, the torque transmission device of the present invention can overcome all the problems of a viscous coupling and a device of the hydraulic pump type.

The cam mechanism 5 directly moves the transmitting member 7 having the clutch operating portion 46, not indirectly through the casing 30 of the vane pump 3. Accordingly, the load applied to the casing 30 of the vane pump 3 can be lowered so that the casing 30 can be thinned. This enables the vane pump 3 to be made in a compact and lightweight design, thus enabling the torque transmission device to be made in a compact and lightweight design.

Further, the lateral wall portion 7b of the transmitting member 7 covers the lateral side of the vane pump 3 and the outer cylindrical portion 7a covers the outer periphery of the casing 30 of the vane pump 3. Accordingly, the transmitting member 7 may also be used as a housing of the torque transmission device. More specifically, since the transmitting member 7 can also serve as a housing of the torque transmission device, the number of the component elements can be reduced to lower the production cost and the torque transmission device can be made in a compact and lightweight design. Particularly, the transmitting member 7 is molded as integrally having the cam portion 51 of the cam mechanism 5. When such a single member also serving as a plurality of parts is made by pressing or the like, the production cost can further be reduced.

In addition, the outer clutch discs 41 and inner clutch discs 42 of the multiple disc clutch 4 are pressingly contacted with each other as held by and between the flange 9a of the side plate 9 and the snap ring 46 attached to the transmitting member 7. Thus, since the flange 9a formed integrally with the side plate 9 is used as a member for pushing the multiple disc clutch 4, it is not required to dispose such a pushing member as an independent member. This further reduces the number of the component elements and makes the torque transmission device in a further compact and lightweight design.

Further, by changing the transmission characteristics of the cam mechanism 5, the force for pressing the discs 41, 42 of the multiple disc clutch 4 to each other can be made variable. Thus, the torque transmission characteristics can be adjusted, for example, as shown by a broken line in FIG. 13.

Further, the multiple disc clutch 4 is disposed around the outer periphery of the casing 30 of the vane pump 3. Such an arrangement shortens the axial size of the torque transmission device as compared with the arrangement in which the multiple disc clutch 4 and the vane pump 3 are disposed in the axial direction.

Further, the casing portion 10b of one side plate 10 covers the outer periphery of the cam ring 32 and a part of the outer periphery of the other side plate 9, and the gap between the inner periphery of the casing portion 10b and the outer periphery of the side plate 9 is hermetically sealed by an O-ring 63. Conventionally, it has been required to hermetically seal two parts, i.e., the gap between the side plate 9 and the cam ring 32 and the gap between the side plate 10 and the cam ring 32. In this embodiment, however, hermetically sealing between the cam ring 32 and the side plates 9, 10 can be achieved at a single part. This reduces the number of the component elements to lower the production cost. Further, the areas requiring precise surface machining to assure good sealing are limited to small areas. This further lower the production cost.

Figure 14:
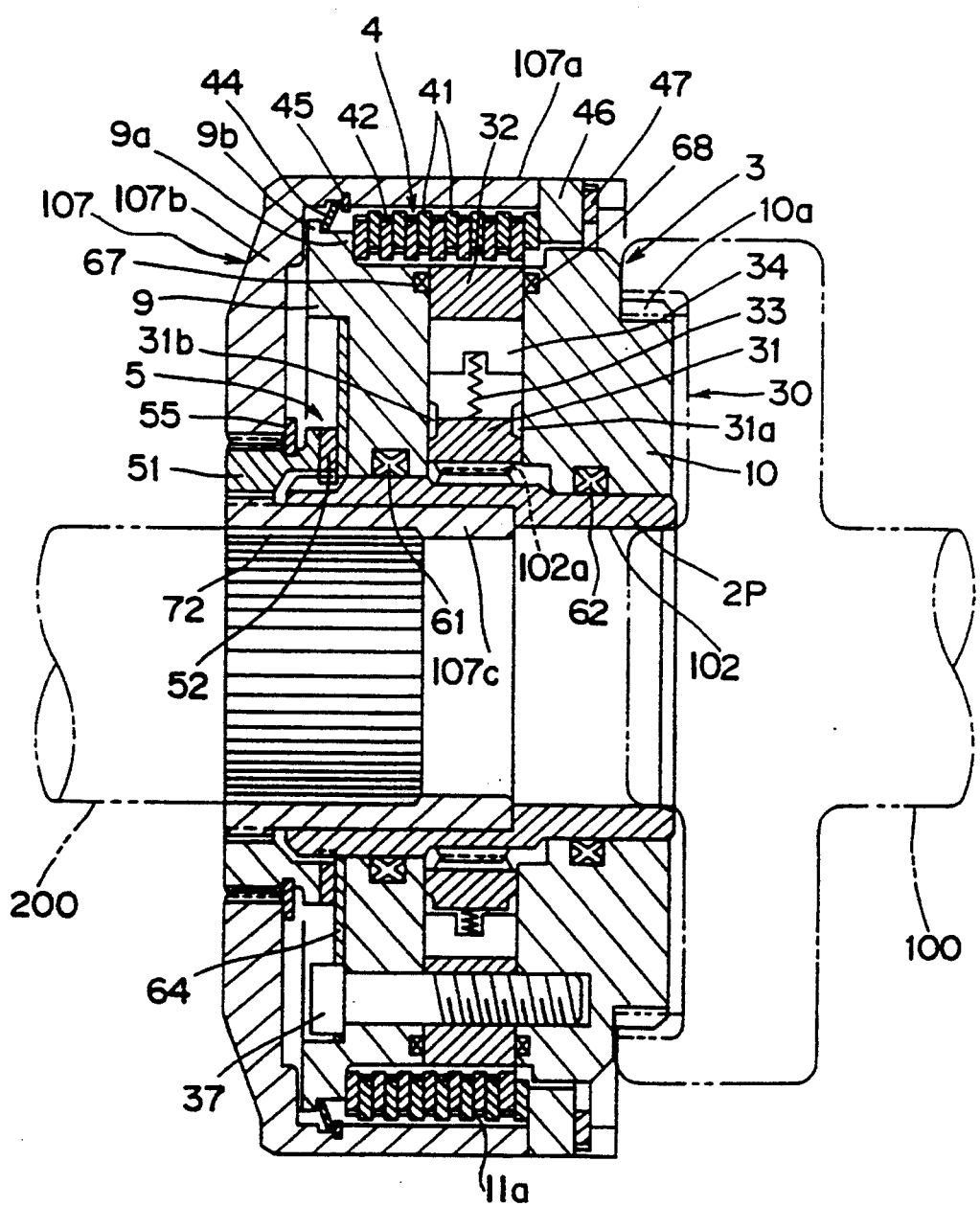
FIG. 14 is a section view of the torque transmission device of a four-wheel drive vehicle according to another embodiment of the present invention.
Figure 15:
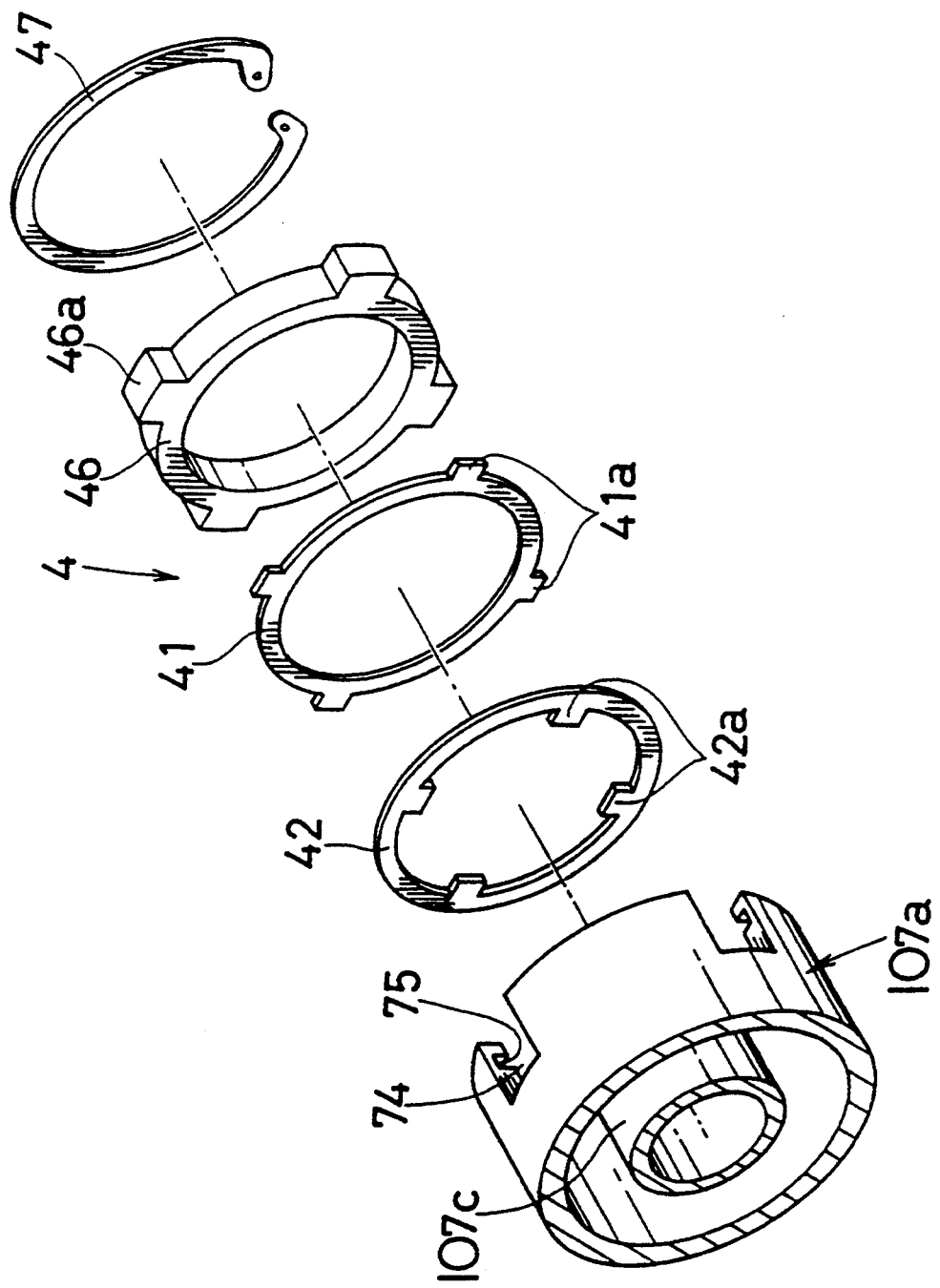
FIG. 15 is an exploded perspective view of the multiple disc clutch and the transmitting member.
Figure 16:
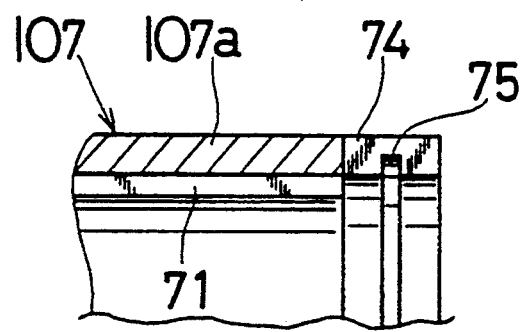
FIG. 16 is a section view of the outer cylindrical portion of the transmitting member.

Referring to FIGS. 14 to 16, the following description will discuss the torque transmission device of a four-wheel drive vehicle according to another embodiment of the present invention. The main differences between this embodiment and the embodiment shown in FIG. 1 reside in the following points i) to v). It is noted that like parts in FIG. 14 are designated by like reference numerals used in FIG. 1. Reference numerals 102 and 102a designate second embodiments of rotary sleeve 2 and outer peripheral spline 2a, respectively.

i) In the embodiment shown in FIG. 1, the cam portion 51 having cam surfaces is formed integrally with the lateral wall portion 107b of the transmitting member 107. In the embodiment shown in FIG. 14, the annular cam member 51 is made separately from the remaining part of the lateral wall portion 107b. In such an arrangement, only the cam member 51 adapted to receive a great contact load and therefore required to present high strength, may be made of iron, and other parts of the transmitting member 107 may be made of aluminium. Thus, the transmitting member 107 can be made lightweight. The inner periphery of the cam member 51 is integrally rotatably splined to the outer periphery of the inner cylindrical portion 107c of the transmitting member 107, and the outer periphery of the cam member 51 is integrally rotatably splined to the inner periphery of the lateral wall portion 107b. A snap ring 55 attached to a peripheral groove formed in the outer peripheral surface of the cam member 51 comes in contact with the right end surface of the lateral wall portion 107b. Accordingly, when the cam member 51 is moved leftward (in the direction that the multiple disc clutch 4 is engaged), the cam member 51 can be moved integrally with the transmitting member 107.

ii) In the embodiment in FIG. 1, the grooves 11 into which the toothed portions 42a in the inner periphery of the inner clutch discs 42 are fitted, are formed in the outer periphery of the casing portion 10b of one side plate 10. In the embodiment in FIG. 14, the grooves 11a extend over and are formed in the outer peripheries of the side plate 9, the cam ring 32 and the side plate 10.

iii) There is disposed an annular belleville spring 44 for biasing the transmitting member 107 having the clutch operating portion 46 in such direction as to disengage the multiple disc clutch 4. Thus, the engagement of the multiple disc clutch 41 can be securely disengaged. The belleville spring 44 is disposed between a snap ring 45 secured to the inner peripheral groove in the outer cylindrical portion 107a of the transmitting member 107 and an annular flange portion 9b of the flange 9a of the side plate 9.

iv) In the embodiment in FIG. 1, the clutch operating portion is formed by a snap ring. In the embodiment in FIG. 14, the clutch operating portion is formed by an annular pushing member 46. The annular pushing member 46 serving as the clutch operating portion is secured to the outer cylindrical portion 107a of the transmitting member 107 by a snap ring 47. Referring to FIGS. 15 and 16, a plurality of radially outwardly extending projections 46a are formed on the outer periphery of the annular pushing member 46 at regular spatial intervals in the circumferential direction. The projections 46a are inserted into grooves 74 formed in the outer cylindrical portion 107a, each of the grooves 74 axially extending by a predetermined length from the right end of the outer cylindrical portion 107a. Thus, the annular pushing member 46 is adapted to be rotated integrally with the transmitting member 107. The snap ring 47 attached to an inner peripheral groove 75 of the outer cylindrical portion 107a prevents the annular pushing member 46 from coming off from the outer cylindrical portion 107a.

v) Seals 67, 68 are respectively disposed between the cam ring 32 and the side plates 9, 10.

Figure 17:
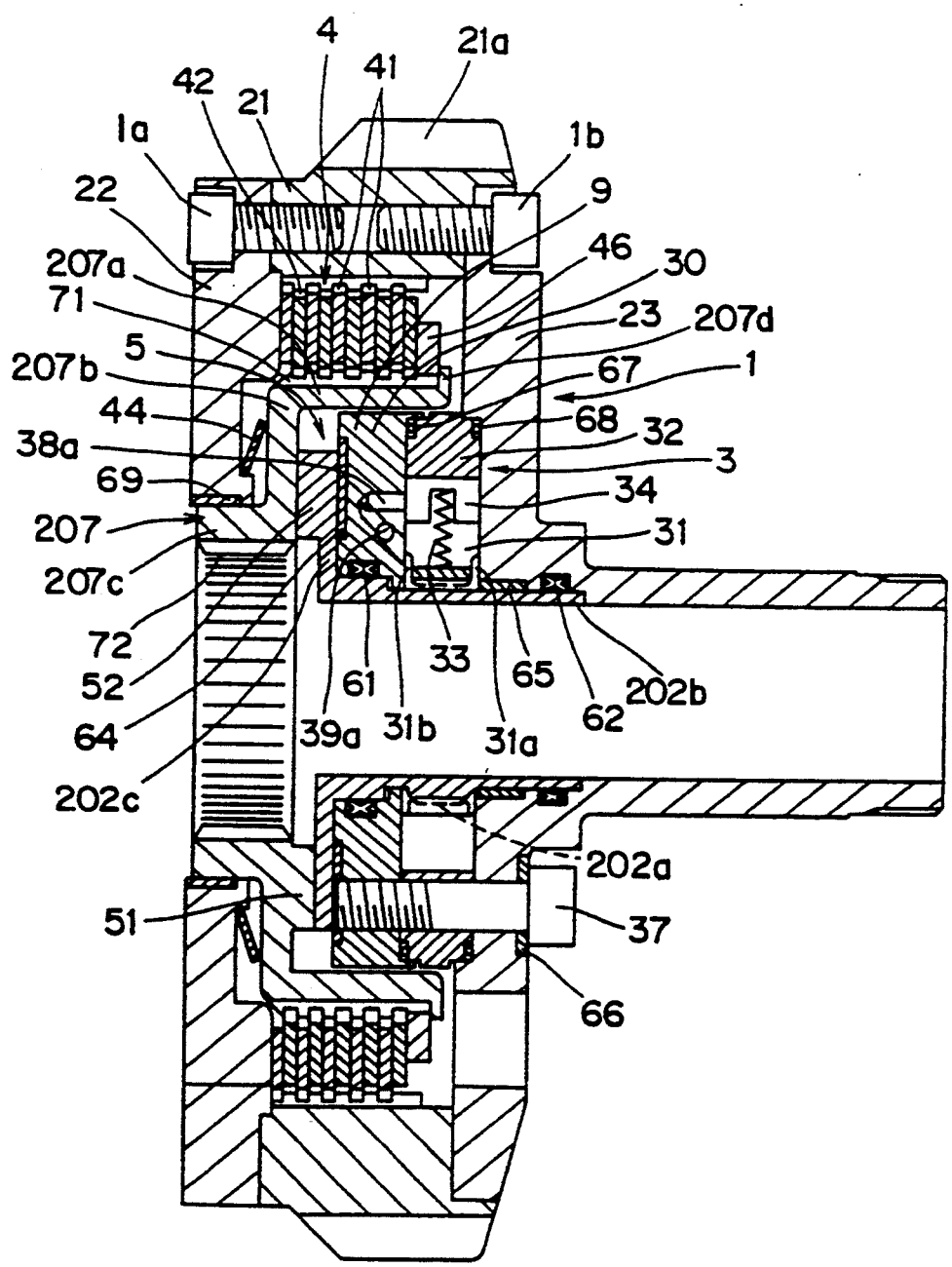
FIG. 17 is a section view of the torque transmission device of a four-wheel drive vehicle according to a further embodiment of the present invention.
Figure 18:
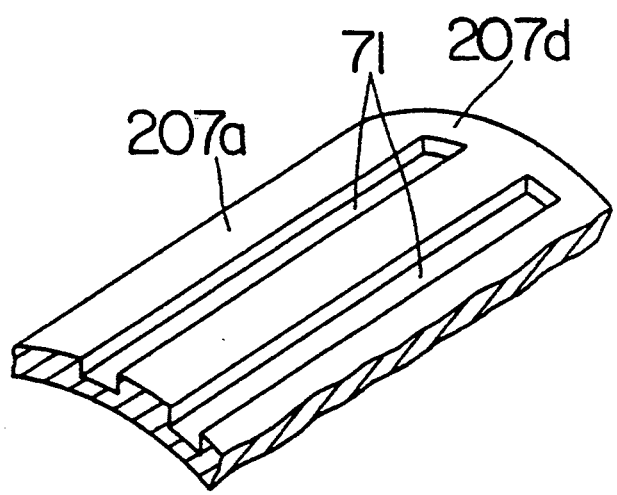
FIG. 18 is a partial perspective view of the outer cylindrical portion of the transmitting member.

Referring to FIGS. 17 and 18, the following description will discuss the torque transmission device of a four-wheel drive vehicle according to a further embodiment of the present invention.

The torque transmission device has a housing 1 including a first housing portion 21 forming the outer peripheral portion of the device, and second and third housing portions 22, 23 respectively forming the lateral sides of the device. The first housing portion 21 and the second housing portion 22 are secured to each other by a bolt 1a, and the first housing portion 21 and the third housing portion 23 are secured to each other by a bolt 1b. The first housing portion 21 has a serrated portion 21a for connecting the first housing portion 21 to a front propeller shaft (not shown). A part of the third housing portion 23 also serves as a side plate of the casing 30 of the vane pump 3. The side plate 9 of the vane pump 3, the cam ring 32 and the third housing portion 23 are integrally rotatably connected to one another by a bolt 37. A plain bearing 65 is attached to the inner periphery of the third housing portion 23. Accordingly, the third housing portion 23 and the rotary sleeve 202 are smoothly relatively rotatable.

The inner cylindrical portion 207c of the transmitting member 207 extends in the direction opposite to the direction in which the outer cylindrical portion 207a extends. The inner cylindrical portion 207c is provided on the inner peripheral surface thereof with an inner peripheral spline 72 for connection to the rear propeller shaft (not shown). The outer peripheral portion of the inner cylindrical portion 207c of the transmitting member 7 is relatively rotatably and axially movably supported by the inner peripheral portion of the second housing portion 22. The second housing portion 22 is provided at the inner peripheral portion thereof with a plain bearing 69. Accordingly, the second housing portion 22 and the transmitting member 207 are relatively rotatable and axially relatively movable in a smooth manner.

The cam mechanism 5 comprises a cam portion 51 integrally formed at the right end surface of the lateral wall portion 207b of the transmitting member 207, and a cam portion 52 integrally formed at the left end surface of a radially extending flange portion 207c formed at the left end of the rotary sleeve 202. The right end surface of the flange portion 202c of the rotary sleeve 202 is smoothly relatively rotatable with respect to the casing 30 under the action of a plain bearing 64 made of an annular metallic plate attached to the left end surface of the side plate 9. Since each of the plain bearings 64, 65, 69 is disposed between the members which relatively rotatably come in contact with each other, the frictional resistance between the members above-mentioned can be reduced. Accordingly, torque transmitted to both propeller shafts can be remarkably reduced particularly in the area presenting a small difference in rotational speed where the connection between both propeller shafts is required to be made loose as much as possible (equivalent to the state where the vehicle travels at a low speed). This securely prevents the so-called tight corner braking phenomenon.

The multiple disc clutch 4 comprises a plurality of annular outer clutch discs 41 splined to the inner peripheral portion of the first housing portion 21 and a plurality of annular inner clutch discs 42 splined to spline grooves 71 formed in the outer peripheral portion of the outer cylindrical portion 207a of the transmitting member 207, the discs 41, 42 being alternately disposed. The discs 41, 42 are pushed to each other as held by and between the right end of the second housing portion 22 and the annular pushing member 46 which serves as a clutch operating portion and of which rightward movement is stopped by a dead-end portion 207d formed at the right end of the outer cylindrical portion 207a of the transmitting member 207. The transmitting member 207 and the first housing portion 21 hold the discs 41, 42 of the multiple disc clutch 4 and are required to have high strength. However, the second and third housing portions 22, 23 are not required to have high strength so much. Accordingly, the second and third housing portions 22, 23 for example may be made of an economical material such as cast metal, aluminium or the like. The second and third housing portions 22, 23 as securely provided with a predetermined strength, may include thin parts and ribs, thus enabling the entire device to be made in a lightweight design with a lower production cost.

As shown in FIG. 18, the outer peripheral surface of the outer cylindrical portion 207a of the transmitting member 207 is made by grinding a blank having a flat cylindrical surface to form the spline grooves 71 with the dead-end portion 207d remaining at the right end of the blank. If such a blank has a radially outwardly projecting portion such as a flange or the like, there is the likelihood that the flange interferes with a grinding tool to make the grinding operation difficult. However, when the blank has no flange likewise in the present embodiment, the spline grooves 71 can be readily formed.

Between the right end surface of the second housing portion 22 and the right end surface of the lateral wall portion 207b of the transmitting member 207, there is disposed an annular belleville spring 44 for biasing the transmitting member 207 having the clutch operating portion 46 in such direction as to disengage the multiple disc clutch 4.

Figure 19:
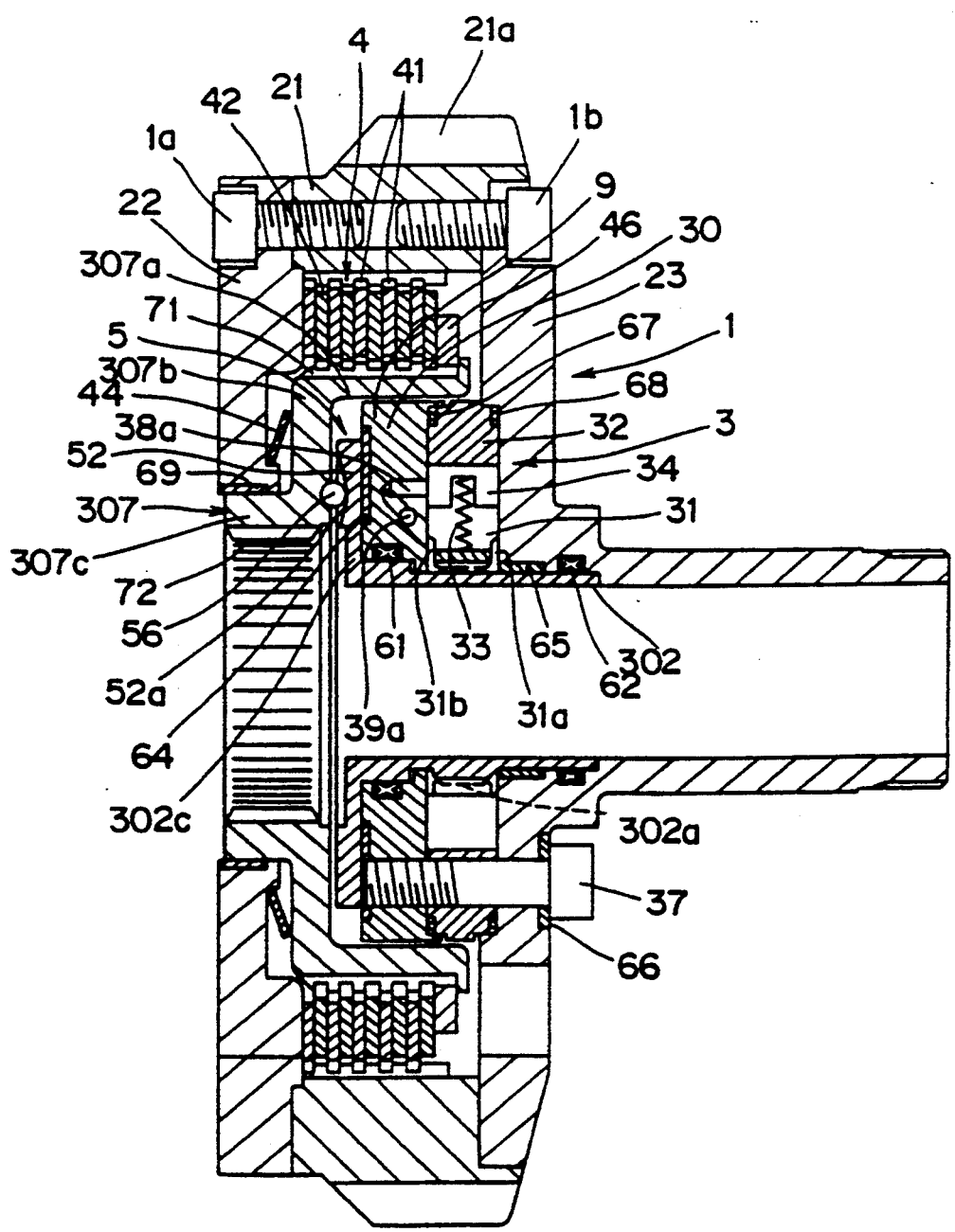
FIG. 19 is a section view of the torque transmission device of a four-wheel drive vehicle according to still another embodiment of the present invention.

As shown in FIG. 19, a ball cam mechanism 5 may be used as the cam mechanism. In the ball cam mechanism 5, balls 56 are housed in a plurality of semi-spherical concave portions formed in the right end surface of the lateral wall portion 307b of the transmitting member 307, the concave portions being formed at regular spatial intervals in the circumferential direction. The cam portion 52 formed at the left end surface of the flange portion 302c of the rotary sleeve 302 comes in contact with the balls 56.

Figure 20:
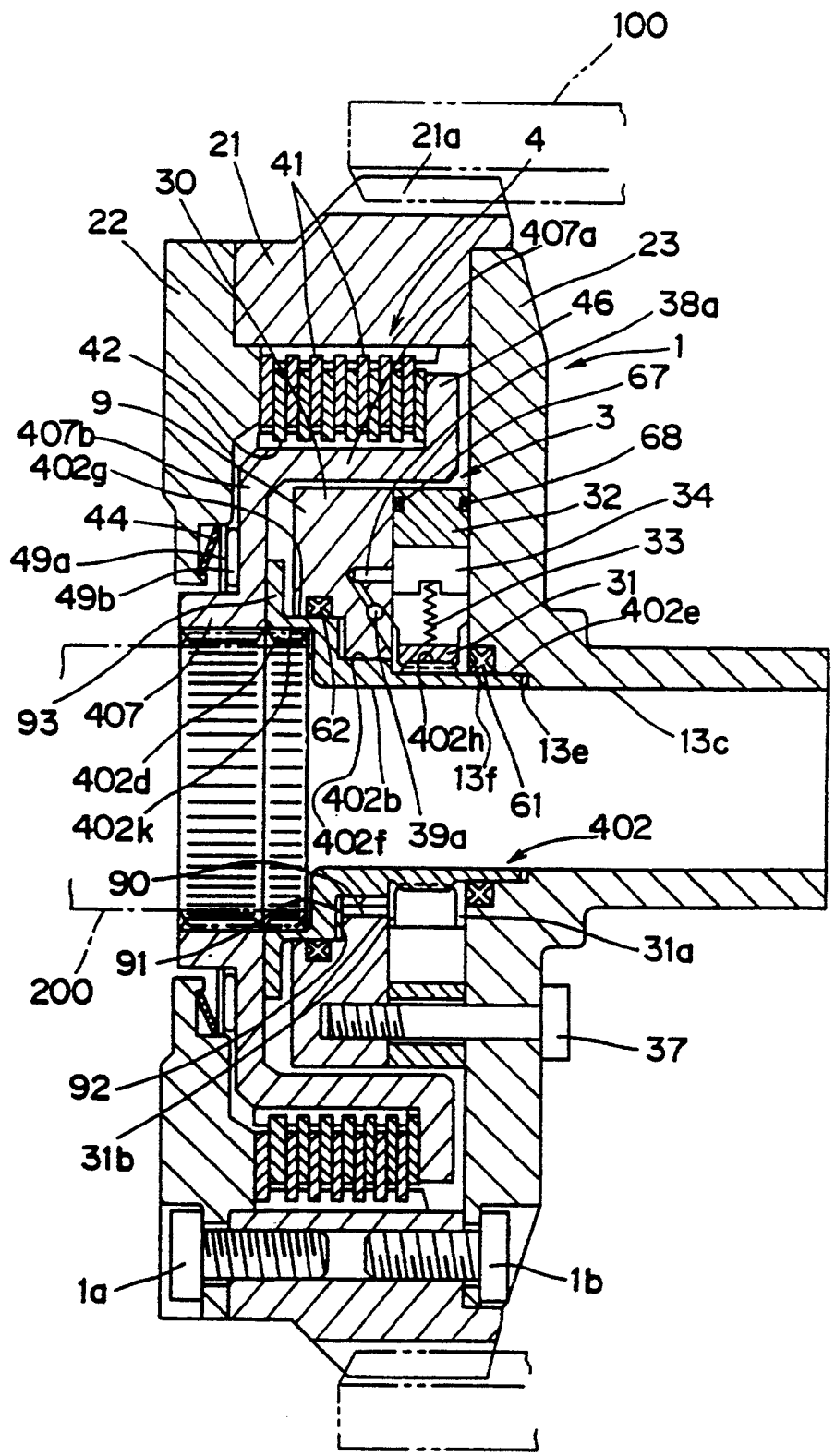
FIG. 20 is a section view of the torque transmission device of a four-wheel drive vehicle according to a still further embodiment of the present invention.

Referring to FIG. 20, the following description will discuss the torque transmission device of a four-wheel drive vehicle according to a still further embodiment of the present invention. The torque transmission device in FIG. 20 is mainly different from the embodiment shown in FIG. 17 in that, as a mechanism for moving the transmitting member 407 having the clutch operating portion 46, a hydraulic piston mechanism is used instead of the cam mechanism 5 used in FIG. 17.

The rotary sleeve 402 is axially movably disposed with respect to the casing 30. The rotary sleeve 402 is provided at the left end thereof with a pushing member 93 comprising a radially outwardly extending annular flange for pushing the right end surface of the lateral wall portion 407b of the transmitting member 407 such that the multiple disc clutch 4 is engaged. The inner peripheral surface of the rotary sleeve 402 comprises a smaller-diameter inner peripheral portion 402b and a larger-diameter inner peripheral portion 402k formed at the left hand with respect to the smaller-diameter inner peripheral portion 402b and splined to the rear propeller shaft. The outer peripheral surface of the rotary sleeve 402 comprises a right-hand outer peripheral portion 402e, an intermediate peripheral portion 402f and a left-hand outer peripheral portion 402g. The portions 402e, 402f, 402g are successively increased in diameter in this order. Disposed between the intermediate peripheral portion 402f and the left-hand peripheral portion 402g is a pressure receiving portion 92 comprising a radially extending annular surface for receiving a discharge pressure from the vane pump 3.

The right-hand outer peripheral portion 402e of the rotary sleeve 402 is relatively rotatably and axially movably supported by an inner peripheral step portion 23e formed on the inner periphery of the third housing portion 23. The gap between the right-hand outer peripheral portion 402e of the rotary sleeve 402 and the inner periphery of the third housing portion 23, is hermetically sealed by a high-pressure seal 61. The right-hand outer peripheral portion 402e has an outer peripheral spline 402h splined to the inner peripheral portion of the rotor 31.

The inner peripheral portion of the side plate 9 has a smaller-diameter portion relatively rotatably fitted to the intermediate outer peripheral portion 402f of the rotary sleeve 402, and a larger-diameter portion relatively rotatably fitted to the left-hand outer peripheral portion 402g of the rotary sleeve 402. The gap between the larger-diameter portion of the side plate 9 and the left-hand outer peripheral portion 402g of the rotary sleeve 402 is hermetically sealed by a seal 62.

An annular concave portion 31b formed in the left end surface of the rotor 31 communicates, through an oil guide hole 90 axially passing through the side plate 9, with an oil chamber 91 formed between the side plate 9 and the rotary sleeve 402. The hydraulic piston mechanism includes the oil chamber 91, the pressure receiving portion 92 and the pushing member 93 of the rotary sleeve 402. The pressure receiving portion 92 of the rotary sleeve 402 forms a part of the inner surface of the oil chamber 91. When the pressure receiving member 92 receives a discharge pressure from the vane pump 3 (the oil pressure discharged from the working chamber A or B presenting a higher pressure), an axial force according to the magnitude of the discharge pressure acts on the rotary sleeve 402. The axial force pushes the transmitting member 407 leftward (in such direction as to engage the multiple disc clutch 4) through the rotary sleeve 402. The axial force is proportional to the magnitude of the discharge pressure from the vane pump 3, i.e., the magnitude of torque transmitted by the vane pump 3. Accordingly, when the torque transmitted by the vane pump 3 exceeds a predetermined level, the multiple disc clutch 4 is engaged to securely couple both propeller shafts to each other. An annular slide plate 49a and a plain bearing 49b made of an annular plate are disposed between the belleville spring 44 for disengaging the multiple disc clutch 4 and the left end surface of the lateral wall portion 407b of the transmitting member 407. Since the slide plate 49a and the plain bearing 49b smoothly slide, a frictional force generated by the relative rotation of the transmitting member 407 with respect to the second housing portion 22 can be minimized.

According to the embodiment above-mentioned, the rotary sleeve 402 itself having the pressure receiving member 92 is axially moved by the discharge pressure from the vane pump 3 to engage the multiple disc clutch 4. More specifically, the rotary sleeve 402 also serves as a piston for pushing the transmitting member 407, thus enabling to remarkably reduce the torque transmission device in sizes as compared with the arrangement where such a piston is separately disposed. When the mechanical cam mechanism 5 is disposed, cam members and the like are required to increase the number of the component elements. Disadvantageously, this increases the production cost and may cause trouble as to durability such as frictional deterioration of cam surfaces or the like. The problems above-mentioned can be overcome in the arrangement of the hydraulic piston type as in this embodiment.

The present invention should not be limited to the embodiments above-mentioned, but the torque transmission device of a four-wheel drive vehicle of the present invention can be used for transmitting torque to the left-hand front-wheel drive shaft and the right-hand front-wheel drive shaft or for transmitting torque to the left-hand rear-wheel drive shaft and the right-hand rear-wheel drive shaft.

Modifications and variations can be made on the present invention without departing from the spirit thereof.

What is claimed is:

1. A four-wheel drive vehicle comprising a front wheel side drive shaft, a rear wheel side drive shaft, and a torque transmission device interposed between said front and rear wheel drive shafts, said torque transmission device comprising:
   a hydraulic pump having a cylindrical casing and a cylindrical rotor, said casing being rotatable interlockingly with one of said drive shafts, said cylindrical rotor being coaxially housed in said cylindrical casing and rotatable interlockingly with the other of said drive shafts, said casing including an end surface and an outer peripheral portion, said rotor including an inner peripheral portion, and said hydraulic pump being adapted to transmit torque between said drive shafts through a variable oil pressure generated in said hydraulic pump according to the difference in rotational speed between said drive shafts;
   a rotary sleeve coaxially integrally rotatably connected to said inner peripheral portion of said rotor, said rotary sleeve being axially relatively movable with respect to said casing, and said rotary sleeve transmitting torque from said other drive shaft to said rotor;
   a multiple disc clutch having a plurality of annular first clutch discs integrally rotatably connected to said casing, and a plurality of annular second clutch discs, said first clutch discs and said second clutch discs being alternately disposed, said multiple disc clutch being adapted to transmit torque between said drive shafts through a frictional coupling power of said first and second discs with said casing and said rotor restrained from being relatively rotated by said frictional coupling power;
   a transmitting member integrally rotatably connected to said other drive shaft and said second clutch discs for transmitting the rotation of said other drive shaft to said second clutch discs, said transmitting member being axially movable with respect to said casing;
   a clutch operating portion disposed on said transmitting member for pushing said first and second discs to cause the same to be frictionally coupled to each other; and
   a hydraulic piston mechanism disposed between said end surface of said casing and said transmitting member for transmitting force to said transmitting member and said rotary sleeve, said hydraulic piston mechanism comprising: (i) an oil chamber disposed between said casing and said rotary sleeve, (ii) an oil guide hole for guiding the oil pressure of the hydraulic pump to said oil chamber, (iii) a pressure receiving member formed on said rotary sleeve facing said oil chamber for receiving the oil pressure, and (iv) a pushing member formed at said rotary sleeve and adapted to push said transmitting member on which said clutch operating portion is disposed, such that said clutch is engaged when said pressure receiving member receives the oil pressure.

2. The vehicle of claims 1, wherein said hydraulic pump comprises a vane pump.

3. The vehicle of claim 1, wherein said multiple disc clutch is coaxially disposed around said outer peripheral portion of said casing of said hydraulic pump.

4. The vehicle of claim 1, further comprising a housing serving as an outer shell of said torque transmission device; and wherein:
   said casing of said hydraulic pump includes a cylindrical cam ring in which said rotor is coaxially housed, and a pair of annular plates by and between which both axial end surfaces of said cam ring are held; and
   said housing includes one of said plates.

5. The vehicle of claim 1, further comprising biasing means for biasing said transmitting member in a direction opposite to the direction in which said transmitting member is moved to engage said multiple disc clutch with said clutch operating portion disposed on said transmitting member.

* * * * *